(12) United States Patent
Boney et al.

(10) Patent No.: US 6,725,930 B2
(45) Date of Patent: Apr. 27, 2004

(54) CONDUCTIVE PROPPANT AND METHOD OF HYDRAULIC FRACTURING USING THE SAME

(75) Inventors: Curtis L. Boney, Houston, TX (US); Matthew J. Miller, Missouri City, TX (US); Sho-Wei Lo, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/126,338

(22) Filed: Apr. 19, 2002

(65) Prior Publication Data

US 2003/0196805 A1 Oct. 23, 2003

(51) Int. Cl.⁷ ............................................ E21B 43/267
(52) U.S. Cl. .................................. 166/280.2; 166/308.1
(58) Field of Search ................................ 166/280, 308, 166/281, 284, 271, 280.1, 280.2, 308.1; 428/402, 407

(56) References Cited

U.S. PATENT DOCUMENTS

| | | | | |
|---|---|---|---|---|
| 3,929,191 A | | 12/1975 | Graham | 166/276 |
| 4,654,266 A | | 3/1987 | Kachnik | 428/403 |
| 4,680,230 A | * | 7/1987 | Gibb et al. | 428/403 |
| 5,330,005 A | | 7/1994 | Card | 166/280 |
| 5,582,249 A | * | 12/1996 | Caveny et al. | 166/276 |
| 5,908,073 A | | 6/1999 | Nguyen | 166/276 |
| RE36,466 E | * | 12/1999 | Nelson et al. | 166/280 |
| 6,059,034 A | | 5/2000 | Rickards | 166/280 |
| 6,330,916 B1 | | 12/2001 | Rickards | 166/280 |

OTHER PUBLICATIONS

Veedburg, R.J., Roodhart, L.P., Davies, D.R. and Penny, G.S.: "Proppant back production During Hydraulic Fracturing: A New Failure Mechanism for Resin Coated Proppants," paper SPE 27382, presented at the SPE International Symposium on Formation Damage Control, Lafayette, Louisiana, USA (Feb. 7–10, 1994).

Dewprashad, B.T., Kuhlman, R.D. and Nguyen, P.D.: "Rock mechanics Evaluation of Resin–Caoted Proppants for Screenless Completions," paper SPE 50734, presented at the International symposium on Oilfield Chemistry, Houston, Texas, USA (Feb. 16–19, 1999).

Card, R.J., Howard, P.R. and Féraud, J.–P.: "A Novel Technology to Control Proppant Back Production,"paper SPE 31007, SPE Production & Facilities (Nov. 1995), 271.

Romero, J. and Féraud, J.P.: "Stability of Proppant Packs Reinforced with Fiber for Proppant Flowback Control," paper SPE 31093, presented at the SPE International Symposium on Formation Damage Control, Lafayette, Louisiana, USA (Feb. 14–15, 1996).

Bartko, K.M., Robertson, B. and Wann, D.: "Implementing Fracturing Technology to the UKCS Carboniferous Formation," paper SPE 38609, presented at the SPE Annual Technical Conference and Exhibition, San Antonio, Texas, USA (Oct. 5–8, 1997).

Stephenson, C.J., Rickards, A.R. and Brannon, H.D.: "Increaded Resistance to Proppant Flowback by Adding Deformable Particles to Proppant Packs Tested in the Laboratory," paper SPE 56593, presented at SPE Annual Technical conference and Exhibition, Houston, Texas, USA (Oct. 3–6, 1999).

Navarrete, R.C., Holms, B. A., McConnell, S.B., and Linton, D.E., "Emulsified Acid Enhances Well Production In High–Temperature Carbonate Formations," Society of Petroleum Engineers 50612, 391–404, Oct. 1998.

* cited by examiner

Primary Examiner—Zakiya Walker
(74) Attorney, Agent, or Firm—Thomas O Mitchell; Robin Nava; Brigitte L. Echols

(57) ABSTRACT

A method for hydraulic fracturing subterranean formation whereby at least part of the fracture is propped with proppant material essentially in the form of elongated particles having a shape with a length-basis aspect ratio greater than 5, preferably such as metallic wire segment. The remaining part of the fracture may be propped with conventional non-metallic proppant. Fracture conductivity is optimized.

34 Claims, 2 Drawing Sheets

CONDUCTIVE PROPPANT AND METHOD OF HYDRAULIC FRACTURING USING THE SAME

TECHNICAL FIELD OF THE INVENTION

This invention relates generally to the art of hydraulic fracturing in subterranean formations and more particularly to a method and means for optimizing fracture conductivity.

BACKGROUND OF THE INVENTION

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack and fracture. Proppant is placed in the fracture to prevent the fracture from closing and thus, provide improved flow of the recoverable fluid, i.e., oil, gas or water.

The proppant is thus used to hold the walls of the fracture apart to create a conductive path to the wellbore after pumping has stopped. Placing the appropriate proppant at the appropriate concentration to form a suitable proppant pack is thus critical to the success of a hydraulic fracture treatment.

Sand, resin-coated sand, and ceramic particles are the most commonly used proppants, though the literature, for instance U.S. Pat. No. 4,654,266, also mentions the used of walnut hull fragments coated with some bonding additives, metallic shots, or metal-coated beads—nearly spherical but having a passageways to improve their conductibility.

The proppant conductivity is affected principally by two parameters, the proppant pack width and the proppant pack permeability. To improve fracture proppant conductivity, typical approaches include high large diameter proppants. More generally, the most common approaches to improve proppant fracture performance include high strength proppants, large diameter proppants, high proppant concentrations in the proppant pack to obtain wider propped fractures, conductivity enhancing materials such as breakers, flow-back aides, fibers and other material that physically alter proppant packing, and use of non-damaging fracturing fluids such as gelled oils, viscoelastic surfactant based fluids, foamed fluids or emulsified fluids. It is also recognized that grain size, grain-size distribution, quantity of fines and impurities, roundness and sphericity and proppant density have an impact on fracture conductivity.

As mentioned above, the main function of the proppant is to keep the fracture open by overcoming the in-situ stress. Where the proppant strength is not high enough, the closure stress crushes the proppant, creating fines and reducing the conductivity. Sand is typically suitable for closure stresses of less than about 6000 psi (41 MPa), resin-coated sand may be used up to about 8000 psi (55 MPa). Intermediate-strength proppant typically consists of fused ceramic or sintered-bauxite and is used for closure stresses ranging between 5000 psi and 10000 psi (34 MPa to 69 MPa). High-strength proppant, consisting of sintered-bauxite with large amounts of corundum is used at closure stresses of up to about 14000 psi (96 MPa).

Permeability of a propped fracture increases as the square of the grain diameter. However, larger grains are often more susceptible to crush, have more placement problems and tend to be more easily invaded by fines. As the result, the average conductivity over the life of a well may be actually higher with smaller proppants.

In an effort to limit the flowback of particulate proppant materials placed into the formation, it was disclosed in U.S. Pat. No. 5,330,005 to add some fibrous material, mixed with the proppant material. It is believed that the fibers become concentrated into a mat or other three-dimensional framework, which holds the proppant thereby limiting its flowback. The fibers can be of glass, ceramic, carbon, natural or synthetic polymers or metal fibers. They have a length of typically about 2 to 30 mm and a diameter of between 10 and 100 micrometers. According to U.S. Pat. No. 5,908,073 the flowback is prevented through the use of fibrous bundles, made of from about 5 to about 200 individual fibers having lengths in the range of about 0.8 to about 2.5 mm and diameters in the range of about 10 to about 1000 micrometers. It has also known from U.S. Pat. No. 6,059,034 to add to blend the proppant material with a deformable particulate material. The deformable particles may have different shapes such as oval, cubic, bar-shaped, cylindrical, multi-faceted, irregular, tapered—but preferably with a maximum length-based ratio equal or less than 5, and are typically spherical plastic beads or composite particles comprising a non-deformable core and a deformable coating. In another embodiment claimed in U.S. Pat. No. 6,330,916, the particles may comprise ground or crushed materials such as nutshells, seed shells, fruit pits, and processed woods.

It should be emphasized that in all of the four above-mentioned U.S. Patents, the proppant itself is constituted of essentially spherical particles—most typically sand—intermingled with a material that may be elongated. This reflects the general understanding of this art that angular grains fail at lower closure stresses, producing more fines and thus reducing fracture conductivity. On the other hand, round and uniform-sized grains result in higher loads before failure since stresses are more evenly distributed.

Adding fibers or fiber-like products to the products may contribute to a reduction of the proppant flowback—and consequently to a better packing of the proppant in the fracture. Additionally, they contribute to prevent fine migrations and consequently, to prevent a reduction of the proppant conductivity but there is still a need for a new type of proppant that will lead to higher conductivity.

It is therefore an object of the present invention to provide a new type of proppant and improved methods of propping a fracture—or a part of a fracture like for instance the extremity of the fracture closer to the wellbore—whereby the proppant conductivity is improved and thus, the subsequent production of the well.

SUMMARY OF THE INVENTION

According to the present invention, a fracture is propped at least partially with a proppant consisting of an elongated particulate material, wherein individual particles of said particulate material have a shape with a length-basis aspect ratio greater than 5, and consists for instance of short metal wire segments for example.

Advantageously, the invention is compatible with techniques known to enhance proppant conductivity such as the use of conductivity enhancing materials (in particular the use of breakers) and the use of non-damaging fracturing based fluids such as gelled oils, viscoelastic surfactant based fluids, foamed fluids and emulsified fluids.

Another feature of this invention is that imaging the fracture geometry is substantially improved when these elongated particulate proppants are metallic or have some metal content. Tools such as resistivity tools, electromagnetic devices, and ultra long arrays of electrodes, can easily detect this proppant enabling fracture height, fracture width, and with processing, the propped fracture length to some extent can be determined.

DETAILED DESCRIPTION AND PREFERRED EMBODIMENTS

Figure 1:
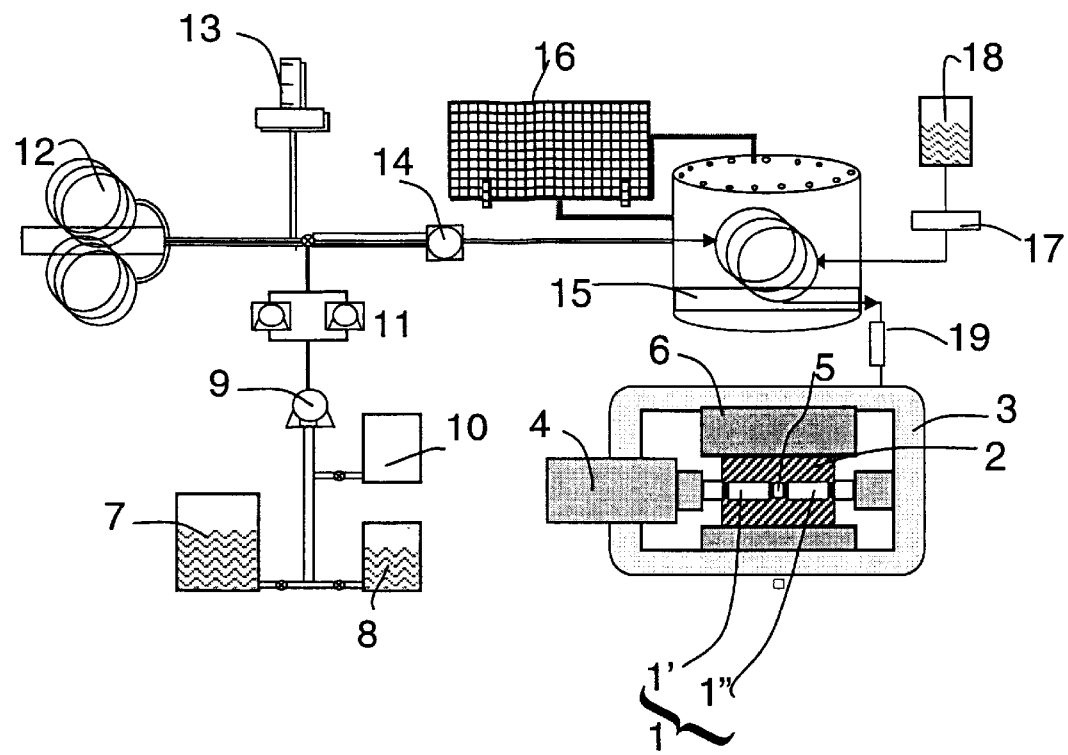
FIG. 1 shows the apparatus used for carrying out hydraulic conductivity tests.

In all embodiments of the disclosed invention, at least part of the fracturing fluid comprises a proppant essentially consisting of an elongated particulate material, wherein individual particles of said particulate material have a shape with a length-basis aspect ratio greater than 5. Though the elongated material is most commonly a wire segment, other shapes such as ribbon or fibers having a non-constant diameter may also be used, provided that the length to equivalent diameter is greater than 5, preferably greater than 8 and most preferably greater than 10. According to a preferred embodiment, the individual particles of said particulate material have a length ranging between about 1 mm and 25 mm, most preferably ranging between about 2 mm and about 15 mm, most preferably from about 5 mm to about 10 mm. Preferred diameters (or equivalent diameter where the base is not circular) typically range between about 0.1 mm and about 1 mm and most preferably between about 0.2 mm and about 0.5 mm. It must be understood that depending on the process of manufacturing, small variations of shapes, lengths and diameters are normally expected.

According to a most preferred embodiment of the present invention, the elongated material is substantially metallic but can include an organic part for instance such as a resin-coating. Preferred metal includes iron, ferrite, low carbon steel, stainless steel and iron-alloys. Depending on the application, and more particularly of the closure stress expected to be encountered in the fracture, "soft" alloys may be used though metallic wires having a hardness between about 45 and about 55 Rockwell C are usually preferred.

The wire-proppant of the invention can be used during the whole propping stage or to only prop part of the fracture. In one embodiment, the method of propping a fracture in a subterranean formation comprises two non-simultaneous steps of placing a first proppant consisting of an essentially spherical particulate non-metallic material and placing a second proppant consisting essentially of an elongated material having a length to equivalent diameter greater than 5. By essentially spherical particulate non-metallic material it is meant hereby any conventional proppant, well known from those skilled in the art of fracturing, and consisting for instance of sand, silica, synthetic organic particles, glass microspheres, ceramics including alumino-silicates, sintered bauxite and mixtures thereof or deformable particulate material as described for instance in U.S. Pat. No. 6,330,916. In another embodiment, the wire-proppant is only added to a portion of the fracturing fluid, preferably the tail portion. In both cases, the wire-proppant of the invention is not blended with the conventional material and the fracture proppant material or if blended with, the conventional material makes up to no more than about 25% by weight of the total fracture proppant mixture, preferably no more than about 15% by weight.

As mentioned before, according to a preferred embodiment, the proppant consists essentially of metallic particles. This creates a unique possibility of evaluating the fracture by resistivity tools, electromagnetic devices, and ultra long arrays of electrodes, can easily detect this proppant enabling fracture height, fracture width, and with processing, the propped fracture length to some extent can be determined.

EXPERIMENTAL METHODS

The conductivity apparatus consists of a 125,000 $lb_f$ load press with automated hydraulic intensifiers and a modified hastelloy API conductivity cell with a 12 $in^2$ flow path (FIG. 1).

A core 1, consisting of two half-cores 1' and 1", is placed in a conductivity cell 2 located in a press frame 3 actuated by a force actuator 4. Between the half-cores 1' and 1", proppant is packed in the interstice 5 that simulates a fracture. The temperature of the conductivity cell 2 is controlled by heated platens 6 contacting the sides of the cell and The fracturing fluid is prepared by mixing guar (from a guar reservoir 7) with a brine (from the brine reservoir 8) through a centrifugal pump 9. The device also includes a third reservoir 10 to receive for instance acid. The blend further goes through intensifier pumps 11 and a shear history loop 12. A cross-linker may be added to a pump 13. The blending process is monitored through a mass sensor 14 before passing through a reservoir simulator 15 in which hot oil circulates through the pistons 16.

Chromatography pumps 17 are used to pump brine through the cell during flowback and conductivity measurements. The pumps draw nitrogen-sparged 2% KCl brine from a 100 gallon flowback reservoir 18. The brine is nitrogen sparged to prevent the introduction of metal oxides into the proppant pack. Before the brine enters the conductivity cell 2, it passes through the reservoir simulator 15 and a silica saturation system 18.

Rosemount pressure transducers (not represented) are used to measure the system pressure and the pressure drop across the length of the fracture. The apparatus can attain a maximum closure stress of 10,000 psi and a maximum temperature of 350° F. The transducers are plumbed with ⅛ in. lines and checked with manometers to an accuracy of one inch of water. A digital caliper (not represented) is used to measure the fracture gap width. The apparatus is capable of running both proppant and acid conductivity.

This apparatus is discussed in Navarrete, R. C., Holms, B. A., McConnell, S. B., and Linton, D. E.: "Emulsified Acid Enhances Well Production in High-Temperature Carbonate Formations", paper SPE 50612 presented at the 1998 SPE European Petroleum Conference, The Hague, The Netherlands, October 20–22.

The baseline permeability of the clean proppant pack was measured in a horizontal fracture at three closure stresses (3000, 6000, 9000 psi). The procedures were as follows:

a) The cores were potted in high temperature RTV silicone rubber to provide a seal between the cores and the walls of the conductivity cell.
b) The cores were vacuum saturated with 2% KCI, and the bottom core was loaded in the conductivity cell.
c) The proppant was manually loaded in the cell at 2.0 lb/ft² and leveled with a blade device to ensure uniform coverage.
d) The top core was loaded in the cell, and 1000 psi closure pressure was applied to the proppant pack. The system back pressure was set at 100 psi, and the proppant pack was saturated with a 2% (w/w) KCI solution injected at 1 mL/min.
e) Once saturated, the net closure pressure was increased to 3000 psi at a rate of 300 psi/min, and the test temperature was increased to 300° F. within 2 hours.
f) Brine was flowed through the pack for 4 hours at 4 mL/min, 3000 psi net closure pressure, and 100° F.
g) After 4 hours, the transducers were zeroed, the fracture gap width was measured, and the conductivity was determined by injecting 2% KCI (w/w) at 6, 8, and 10 mL/min. The differential pressure drop across the length of the proppant pack was allowed to equilibrate for 5 minutes at each flowrate, and Darcy's law was used to calculate an average permeability.
h) The closure stress was increased to the next level at a rate of 300 psi/min, and steps 6 and 7 were repeated.

Results and Discussion

EXAMPLE 1

Since most common proppants are made of sand or ceramic, a first test was made to compare proppant made of metallic balls, made of stainless steel SS 302, having an average diameter of about 1.6 mm. Wire proppant was manufactured by cutting an uncoated iron wire of SS 302 stainless steel into segments approximately 8 mm long. The wire was about 1.6 mm diameter.

The proppant was deposited between two Ohio sandstone slabs in a fracture conductivity apparatus and subjected to a standard proppant pack conductivity test as described above. The experiments were done at 100° F., 2 lb/ft² proppant loading and 3 closure stresses, 3000, 6000 and 9000 psi (corresponding to about 20.6, 41.4 and 62 MPa). The permeability, fracture gap and conductivity results of steel balls and wires are shown in Table 1.

TABLE 1

| Closure Stress | Permeability (darcy) | | Fracture Gap (inch) | | Conductivity (md-ft) | |
|---|---|---|---|---|---|---|
| (psi) | Ball | Wire | Ball | Wire | Ball | Wire |
| 3000 | 3,703 | 10,335 | 0.085 | 0.119 | 26,232 | 102,398 |
| 6000 | 1,077 | 4,126 | 0.061 | 0.095 | 5,472 | 33,090 |
| 9000 | 705 | 1,304 | 0.064 | 0.076 | 3,174 | 8,249 |

The conductivity is the product of the permeability (in milliDarcy) by the fracture gap (in feet). Clearly, the wire proppant performs better than the metallic spherical proppant.

EXAMPLE 2

Figure 2:
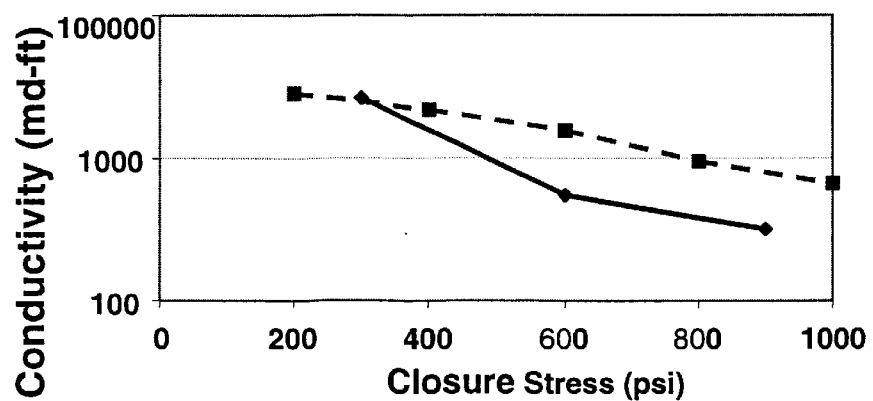
FIG. 2 shows hydraulic conductivity versus closure stress with 14–20 resin coated sintered bauxite proppant (dotted line) and metal ball proppant (solid line).

In this second test, the metal balls of example 1 were compared with 14/20 sintered bauxite. FIG. 2 is a plot of the conductivity depending on the closure stress where the data for the metallic balls are represented with a solid line, and the comparative data with bauxite proppant are represented with a dotted line.

At low closure stress (less than 3000 psi), the conductivity are similar, however, the conductivity of the steel balls decreased greatly with closure stress. It is assumed that the low conductivity is caused by two reasons. First, due to the high density of the material, the proppant pack width was very small, which caused lower conductivity. Secondly, due to the hardness of the material, the steel balls became deeply embedded and a substantial amount of fines were generated. The proppant pack was damaged by the fines and the embedment reduced the pack width. The hardness of proppant is advantageous to the pack conductivity since the stronger proppants are able to stand high closure stresses. However, if the proppant hardness greatly exceeds the hardness of formation, the proppants can cause severe formation surface damage by embedding in the formation, and fines are generated from crushed formation and reduce pack permeability. Embedment is more severe at high closure stresses, which explains why the conductivity dropped greatly with closure stress.

Spherical proppant diameter also exhibits an effect on embedment. Large diameter proppant causes greater embedment than smaller proppant. The reason may be that large diameter proppant has relatively few points of contact with the formation. Therefore, there is very high point loading on the formation. When stress is applied, the high point loading causes formation failure. The core surface treated with steel ball proppant was severely damaged after the experiment and lots of fines were observed.

EXAMPLE 3

Wire proppant was manufactured by cutting an uncoated iron wire into segments approximately 0.375" long. The wire was 0.02" in diameter. This wire was deposited between two Ohio sandstone slabs in a fracture conductivity apparatus and subjected to a standard proppant pack conductivity test as described above. The predicted conductivity of 16/30 Sintered Bauxite was compared to the wire proppant conductivity. It was selected because it is the highest conductivity proppant regularly used by the industry.

Figure 3:
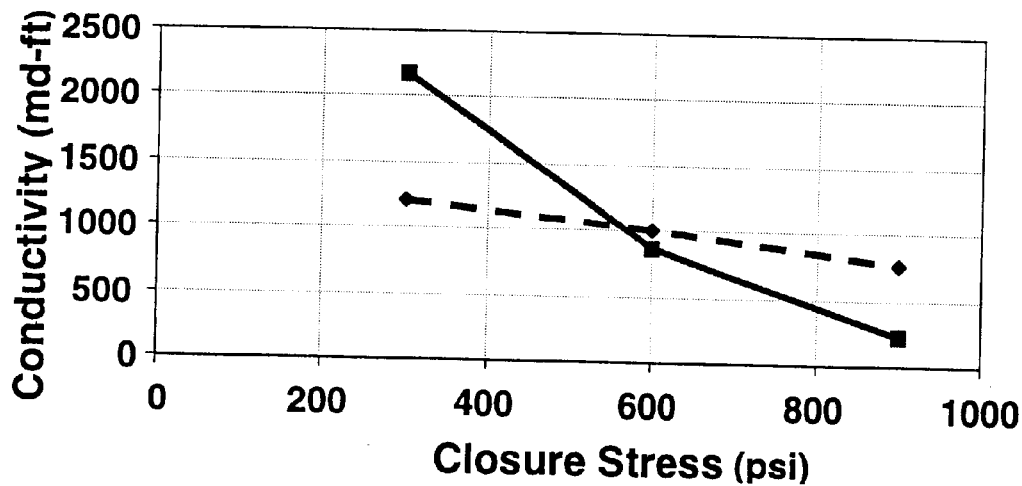
FIG. 3 shows hydraulic conductivity versus closure stress with proppant consisting of 16/30 sintered bauxite (dashed line) and proppant according to the present invention (solid line)
Figure 4:
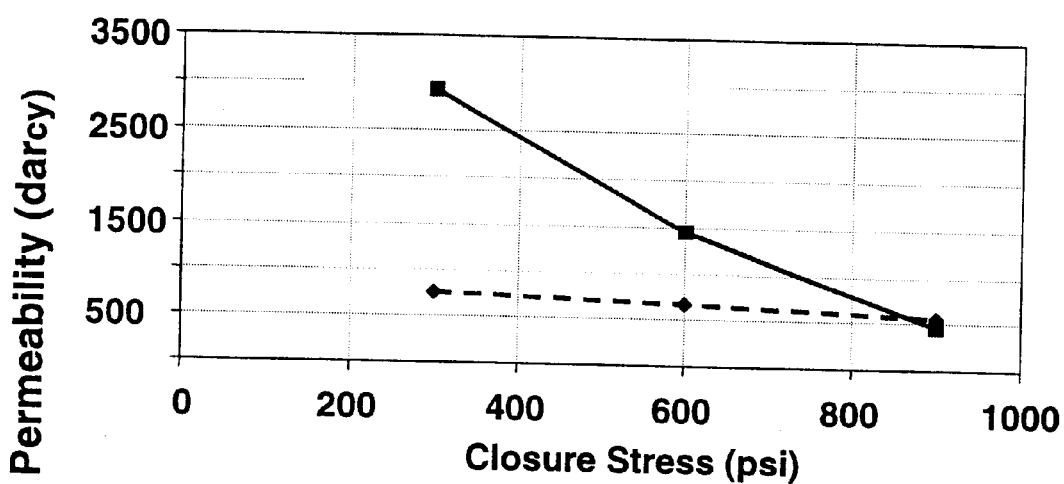
FIG. 4 shows permeability versus closure stress with proppant consisting of 16/30 sintered bauxite (dashed line) and proppant according to the present invention (solid line).

Results of the conductivity experiments with a 2.0 lbm/ft² loading are listed in Table 2. FIG. 3 is the plot of the results and shows conductivity comparison between 16/30 sintered bauxite (dotted line) and wire proppant (solid line). The baseline proppant-pack permeability values of 16/30 Sintered Bauxite as predicted were also plotted in FIG. 4 where again, the dotted line represent the standard sintered bauxite of the prior art and the solid line, the wire proppant of the invention. The Sintered Bauxite permeability and conductivity predictions were made using the program PredictK, (named PredictK from Stim-Lab) that predicts the permeability and conductivity of a proppant pack as a function of proppant type, size, sieve, concentration, closure stress, temperature, and rock mechanical properties. The predictions are based on hundreds of conductivity experiments performed by well services companies laboratories and several petroleum and service companies. It is apparent that the wire proppant outperformed the 16/30 Sintered Bauxite by a substantial margin at 3000 psi. At higher closure stress, the wire permeability is comparable to much higher than the bauxite, but because the wire proppant pack width is much less, the conductivity of the wire proppant pack is less than bauxite. This soft iron material shows the benefit of nonspherical proppant at low closure stress but also illustrates that properties other than shape are important. For high performance at high closure stress, a harder material is beneficiary.

TABLE 2

| Closure stress (psi) | 3000 psi | 6000 psi | 9000 psi |
|---|---|---|---|
| 16/30 Sintered Bauxite | | | |
| Perm (darcy) | 768 | 678 | 551 |
| Frac Gap (in) | 0.1874 | 0.1769 | 0.1663 |
| Conductivity (md-ft) | 11992 | 9995 | 7634 |
| 0.375" length/0.02" diameter wire | | | |
| Perm (darcy) | 2936 | 1452 | 458 |
| Frac Gap (in) | .089 | .071 | .060 |
| Conductivity (md-ft) | 21773 | 8589 | 2288 |

It was observed that the wire proppant had a larger surface area in contact with the fracture face than the spherical proppant. Thus, the wire proppant may resist deep embedment into the fracture face because the applied force is distributed along a larger surface area. We also observed what appeared to be a high pack porosity, as evidenced by large areas along the fracture face where absolutely no proppant embedment occurred. This observation indicated that the proppant pack contained large voids that are absent in spherical proppant packs. These large voids will contribute to high permeability values. Also, the wire proppant is likely to have very good proppant pack stability and may not suffer from proppant flowback problems as spherical proppants do.

After this first conclusive test showing that metallic wire can be used to replace standard proppant, new tests were performed to investigate the influence of different parameters such as wire gauge, hardness, coating, length and duration of stress exposure. All of the experiments were done at 100° F., 2 lb/ft² proppant loading. These results were also compared with a conventional high strength proppant Carbo HSP (16/30 sintered bauxite).

EXAMPLE 4

Wire Gauge

Experiments were done with 0.25" long, 26 gauge (0.016") and 31 gauge (0.009") 302 SS wires. Test results are reported in Table 3 below:

TABLE 3

| | Permeability (Darcy) | | Conductibility (md-ft) | | Fracture Width (inch) | |
|---|---|---|---|---|---|---|
| Closure stress (psi) | 31 gauge (0.009") | 26 gauge (0.016") | 31 gauge (0.009") | 26 gauge (0.016") | 31 gauge (0.009") | 26 gauge (0.016") |
| 3000 | 1501 | 2058 | 15513 | 15524 | 0.112 | 0.090 |
| 6000 | 1087 | 1765 | 8471 | 11691 | 0.093 | 0.079 |
| 9000 | 868 | 1493 | 5969 | 8644 | 0.082 | 0.069 |

The following conclusions about the wire gauge impact on permeability and conductivity can be drawn: The pack permeability decreases with wire diameter for 302 SS (hard) wire.

The fracture width of wire with smaller diameter is higher. The width difference is greater at low closure stresses.

At low closure stress (3000 psi), the small-diameter and large-diameter wire packs have similar conductivity. At intermediate (6000 psi) and high (9000 psi) closure stresses, the large-diameter wire results in higher conductivity.

In comparison with 20/40 Carbo HSP proppant, as shown in table 4 below, the permeability and conductivity of the wire are higher. However, the wire proppant fracture width is smaller at an equivalent loading of 2 lb/ft².

TABLE 4

| 20/40 Carbo HSP propppant | | | |
|---|---|---|---|
| Closure Stress (psi) | Permeability (Darcy) | Conductibility (md-ft) | Fracture Width (inch) |
| 3000 | 479 | 7168 | 0.18 |
| 6000 | 435 | 6163 | 0.17 |
| 9000 | 353 | 4730 | 0.161 |

EXAMPLE 5

Wire Hardness

The experiments of wires with two material were performed, 302 SS (hard) and a mild steel (soft) at a proppant loading of 2 lb/ft². Test results are reported in Table 5 below:

TABLE 5

| | Permeability (Darcy) | | Conductibility (md-ft) | | Fracture Width (inch) | |
|---|---|---|---|---|---|---|
| Closure Stress (psi) | 22 gauge mild steel | 26 gauge SS302 | 22 gauge mild steel | 26 gauge SS302 | 22 gauge mild steel | 26 gauge SS302 |
| 3000 | 2936 | 2058 | 21773 | 15524 | 0.089 | 0.090 |
| 6000 | 1466 | 1765 | 8676 | 11691 | 0.071 | 0.079 |
| 9000 | 433 | 1493 | 2256 | 8644 | 0.063 | 0.069 |

The following conclusions were drawn:

The soft wire has higher permeability and conductivity at low closure stress (most likely because it was a lower gauge wire, i.e., larger diameter).

The permeability and conductivity of soft wire drop significantly with closure stress. Hard wire maintains its permeability and conductivity to a much greater extent than the soft wire.

In comparison with 20/40 Carbo HSP (see table 4), the soft wire proppant pack has much higher permeability and conductivity at low closure stress. The hard wire maintains a higher permeability and conductivity than the 20/40 Carbo HSP across all closure stresses.

EXAMPLE 6

Wire Coating

Experiments were performed with 22 gauge soft steel wire, with and without coating at a proppant loading of 2 lb/ft². Test results are reported in Table 6 below:

TABLE 6

| Closure Stress (psi) | Permeability (Darcy) | | Conductibility (md-ft) | | Fracture Width (inch) | |
|---|---|---|---|---|---|---|
| | Without coating | With coating | Without coating | With coating | Without coating | With coating |
| 3000 | 2936 | 672 | 21773 | 4841 | 0.089 | 0.087 |
| 6000 | 1466 | 431 | 8676 | 2894 | 0.071 | 0.080 |
| 9000 | 433 | 227 | 2256 | 1334 | 0.063 | 0.070 |

The following conclusions were drawn:

The wire with coating results in much lower permeability and conductivity

The wire with coating has higher fracture width

The proppant pack pore spaces were damaged with the coating material.

EXAMPLE 7

Wire Length

Soft steel wires with coating were tested at two different length 0.5" and 0.2" at a proppant loading of 2 lb/ft$^2$. Test results are reported in Table 7 below:

TABLE 7

| Closure Stress (psi) | Permeability (Darcy) | | Conductibility (md-ft) | | Fracture Width (inch) | |
|---|---|---|---|---|---|---|
| | 0.5" | 0.2" | 0.5" | 0.2" | 0.5" | 0.2" |
| 3000 | 278 | 206 | 3471 | 1696 | 0.150 | 0.099 |
| 6000 | 268 | 125 | 2930 | 854 | 0.131 | 0.082 |
| 9000 | 264 | 399 | 2445 | 2400 | 0.111 | 0.072 |

The following conclusions were drawn:

Soft steel wires with coating were tested at two different length 0.5" and 0.2".

The 0.5" wire has slightly higher fracture width

The permeability and conductivity values for long and short wires are similar.

EXAMPLE 8

Duration of Stress Exposure Duration of Stress Exposure

One long term conductivity test was done with 26 gauge coated wire at 2 lb/ft$^2$ proppand loading and 9000 psi of closure stress. The flow rate was 4 mL/min. The conductivity was measured after 4, 24, 48 and 72 hours. Test results are reported in Table 7 below:

TABLE 7

| | Permeability (Darcy) | Conductibility (md-ft) | Fracture Width (inch) |
|---|---|---|---|
| 4 hr | 217 | 1404 | 0.077 |
| 24 hr | 259 | 1578 | 0.073 |
| 48 hr | 331 | 2012 | 0.073 |
| 72 hr | 329 | 2000 | 0.073 |

The following observations were made:

For the first 24 hours, the permeability and conductivity of the proppant pack did not change much.

The conductivity increases significantly after 24 hours, but the reason is not known at this time. It stabilized after 48 hours.

The duration of stress exposure does not have much impact on the fracture width.

What is claimed is:

1. A method of propping a fracture in a subterranean formation including the step of placing a proppant consisting essentially of an elongated particulate material, wherein individual particles of said particulate material have a shape with a length-basis aspect ratio greater than 5.

2. The method of claim 1, wherein said individual particles of said elongated particulate material have a shape with a length-basis aspect ratio greater than 10.

3. The method of claim 1 or 2, wherein individual particles of said elongated particulate material have a wire-segment shape.

4. The method of claim 1, wherein said elongated particulate material is substantially metallic.

5. The method of claim 4, wherein said elongated particulate material is selected from the group consisting of iron, ferrite, low carbon steel, stainless steel and iron-alloys.

6. The method of claim 1, where said elongated particulate material consists of metallic wires having a hardness of between 45 and 55 Rockwell.

7. The method of claim 1, wherein said individual particles of said elongated particulate material are resin-coated.

8. The method of claim 1, wherein said individual particles of said elongated particulate material have a length of between 1 and 25 mm.

9. The method of claim 8, wherein said individual particles of said elongated particulate material have a length of between about 2 and about 15 mm.

10. The method of claim 1, wherein said individual particles of said elongated particulate material have a diameter of between about 0.1 mm and about 1 mm.

11. The method of claim 10, wherein said individual particles of said elongated particulate material have a diameter of between about 0.2 mm and about 0.5 mm.

12. A method of propping a fracture in a subterranean formation with proppant comprising two non-simultaneous steps of placing a first proppant consisting of an essentially spherical particulate non-metallic material and placing a second proppant consisting essentially of an elongated material having a length to equivalent diameter greater than 5.

13. The method of claim 12, wherein said individual particles of said elongated particulate material have a shape with a length-basis aspect ratio greater than 10.

14. The method of claim 12 or 13, wherein individual particles of said elongated particulate material have a wire-segment shape.

15. The method of claim 12, wherein said elongated particulate material is substantially metallic.

16. The method of claim 15, wherein said elongated particulate material is selected from the group consisting of iron, ferrite, low carbon steel, stainless steel and iron-alloys.

17. The method of claim 12, where said elongated particulate material consists of metallic wires having a hardness of between 45 and 55 Rockwell.

18. The method of claim 12, wherein said individual particles of said elongated particulate material are resin-coated.

19. The method of claim 12, wherein said, individual particles of said elongated particulate material have a length of between 1 and 25 mm.

20. The method of claim 19, wherein said individual particles of said elongated particulate material have a length of between about 2 and about 15 mm.

21. The method of claim 12, wherein said individual particles of said elongated particulate material have a diameter of between about 0.1 mm and about 1 mm.

22. The method of claim 21, wherein said individual particles of said elongated particulate material have a diameter of between about 0.2 mm and about 0.5 mm.

23. A method of fracturing a subterranean formation comprising injecting a fracturing fluid into a hydraulic fracture created into a subterranean formation wherein at lest a portion of the fracturing fluid comprises as proppant an elongated particulate material, wherein individual particles of said particulate material have a shape with a length-basis aspect ratio greater than 5.

24. The method of claim 23, wherein said portion of the fracturing fluid is the tail portion.

25. The method of claim 23, wherein said individual particles of said elongated particulate material have a shape with a length-basis aspect ratio greater than 10.

26. The method of claim 23 or 25, wherein individual particles of said elongated particulate material have a wire-segment shape.

27. The method of claim 23, wherein said elongated particulate material is substantially metallic.

28. The method of claim 27 wherein said elongated particulate material is selected from the group consisting of iron, ferrite, low carbon steel, stainless steel and iron-alloys.

29. The method of claim 23, where said elongated particulate material consists of metallic wires having a hardness of between 45 and 55 Rockwell.

30. The method of claim 23, wherein said individual particles of said elongated particulate material are resin-coated.

31. The method of claim 23, wherein said individual particles of said elongated particulate material have a length of between 1 and 25 mm.

32. The method of claim 31, wherein said individual particles of said elongated particulate material have a length of between about 2 and about 15 mm.

33. The method of claim 31, wherein said individual particles of said elongated particulate material have a diameter of between about 0.1 mm and about 1 mm.

34. The method of claim 33, wherein said individual particles of said elongated particulate material have a diameter of between about 0.2 mm and about 0.5 mm.

* * * * *